United States Patent Office 2,743,186
Patented Apr. 24, 1956

---

2,743,186

MANUFACTURE OF CHEESE

Norman Kraft, Northbrook, and Paul J. Ward, Mount Prospect, Ill., assignors to Kraft Foods Company, Chicago, Ill., a corporation of Delaware No Drawing. Application September 17, 1952,
Serial No. 310,118

12 Claims. (Cl. 99—116)

The present invention relates generally to the manufacture of cheese and cheese products and it particularly relates to the manufacture of a product for use in the manufacture of process cheese.

In the manufacture of cheese of the American, Canadian and English Dairy types, raw or pasteurized milk is placed in a vat and a lactic acid starter added to the milk. When the desired degree of acid development has been reached, rennet is added in order to set or coagulate the milk, whereupon the resulting curd is cut and the vat is heated for a period of time sufficient to permit the curd to firm and lactic acid to develop. The vat is then drained, and the curd cheddared and/or washed. The curd is then pressed into hoops and cured as cheese. During curing, cheese develops flavor and the curd mats and knits together to form a smooth textured mass.

The time of curing depends upon the use to which the cheese is to be put and the desired flavor development. The curd is normally cured for 10 to 30 days if it is to be used as current or body cheese in the manufacture of process cheese, or it may be cured for five or six months to provide short held cheese which is also used in the manufacture of process cheese. Upon additional curing, the cheese develops further and, after about a year, is considered to be aged cheese which may be consumed as such or combined to make process cheese.

In the manufacture of process cheese, such as Cheddar type process cheese, a blend of cheeses is usually prepared, the blend comprising Cheddar type cheese, for example the American, Canadian and English Dairy types of cheeses. The blend usually comprises current cheese, short-held cheese, and some aged cheese. Each of the cheeses of the blend is comminuted and placed in a cooker, along with a small amount of emulsifying salt, such as disodium phosphate, and heated. The resulting product which is process cheese, is packaged while hot in loaf form.

The principal object of the present invention is to provide an improved product for use in connection with the manufacture of cheese and cheese products. An additional object of the invention is the provision of such a product which may be made in a short period of time and promptly used, i. e. without an aging period of even 10 days, in the manufacture of process cheese. A still further object of the invention is the provision of an improved product for blending with aged cheese in the manufacture of process cheese, which product can be employed in substantial amounts and can be standardized so as to produce a high quality process cheese having standard body, taste, and slicing characteristics. Another object of the invention is the provision of a product which can be used exclusively in process cheese; and which can be used in process cheese manufacture with or without the addition of an emulsifying salt.

In general, in the practice of my invention, curd is prepared in accordance with the usual cheese making procedure. That is to say, either raw or pasteurized milk is placed in a vat, the usual lactic acid starter is added to the milk and the acidity of the milk is allowed to develop to the desired amount, normally about .195 percent of lactic acid. After this acid development, rennet is added to set the milk. When the curd has reached the desired degree of firmness, it is cut with curd knives of the type normally used in making Cheddar cheese. The vat is then heated to between about 95° F. and 106° F. and held at a temperature in this range for a period of time sufficient to permit the curd to further firm and lactic acid to develop. The temperature is maintained and the curd is drained so as to leave a firm, resilient curd, this normally occurring, depending upon the milk used, when the lactic acid content of the last whey drained from the curd is between about .25 to .37 percent.

The acid development may be accomplished through dry acid development or wet acid development. The former is preferred in order to provide an end product of desired moisture and is accomplished by draining substantially all of the whey from the curd and allowing the curd acidity to develop in the substantially dry condition. Wet acid development results in an end curd product which has high moisture and is, of course, accomplished while the curd is immersed in the whey.

After the whey is drained from the curd, the curd is completely immersed in a lactic acid solution, the acid solution having an acidity between about .2 and 1.5 percent lactic acid. While a lactic acid solution is preferred for immersing the curd, because such acid is naturally occurring in cheddar cheese manufacture, other relatively strong edible acid solutions such as acetic acid, tartaric acid, citric acid and phosphoric acid solutions may be satisfactorily employed provided that the acid strength is equivalent to the strength of the above mentioned lactic acid solution. The curd and lactic acid solution are heated with agitation for a period of time, and when the desired curd is obtained, the acid is withdrawn from the curd.

The temperature to which the curd and acid solution are heated is quite important in order to provide curd of the desired characteristics. In this connection, the temperature should be above about 90° F. but should not be above about 120° F. If the acid temperature is below 90° F., the acid tends to be absorbed into the curd to an undesired degree and provides a curd which is non-matting and which does not knit so that it does not satisfactorily cure. In this connection, the curd of our invention mats and knits when cured and upon aging provides a highly satisfactory cheese having smooth texture.

We have found that when the curd is cooked to temperatures at the upper end of the temperature range specified, i. e. 90° F. to 120° F., the curd tends to become softer and has a higher moisture content; and when cooked to temperatures above 120° F., the curd becomes so moist and soft as to have little utility in the manufacture of known cheese products. This is quite unexpected and is contrary to known teachings of the cheese art which were that as the curd was cooked to higher temperatures, it expectedly became drier and more firm.

While satisfactory curd can be produced in the temperature range specified above, i. e. 90° F. to 120° F., most satisfactory results are obtained at temperatures between about 102° F. and 110° F.

The time of heating is also important in controlling moisture. We have found that longer periods of heating result in higher moisture while shorter heating periods provide a curd having lower moistures. In general, to provide curd of the desired characteristics for use in the manufacture of process cheese the curd should be heated from 6 minutes to 40 minutes.

Thus, we have found a new and important relationship for controlling curd and cheese moisture, and this is a salient factor because the moisture requirements of process cheese are established by law. In this connection, it has usually been necessary in the past to achieve the desired moisture content of process cheese through control of short held and aged cheese in the blend, which method of control is not desirable. Through the practice of our invention, we have found it possible to prepare curd having moisture contents susbtantially below that of the usually available body cheese, and as a result, the moisture content of process cheese may be controlled by the cheese of our invention.

The temperature of the acid solution, which immerses the curd, may be raised to the desired temperature, relatively slowly or the temperature of the acid may be raised as rapidly as possible. Rapid heating of the curd in acid has, in the past, been thought to result in case hardening of the curd and to be generally undesirable. Therefore, not only does the rapid heating of the curd produce an unexpected and new result, but it also makes possible more efficient use of cheese making equipment. In the latter connection, it is possible to decrease the time required for making the curd, and, as a result, more curd can be handled in the equipment. As an example of the rapid heating which is possible without case hardening the curd particles 500 pounds of curd immersed in 1000 pounds of acid solution was heated from 88° F. to 110° F. in 15 minutes.

As before indicated, the moisture content of the resulting curd may be controlled through adjustment of the cooking temperature and time of cook, and in addition, it may also be controlled through adjustment of the acidity of the acid solution within the limits specified and the degree of acid development of the curd before it is immersed in lactic acid.

It has been found that, in general, the particular temperature to which the acid must be heated to attain the desired curd condition is related to the solids content of the milk used, higher temperatures being required for milk of lower solids content.

We have discovered that the proper curd is obtained when the acidity of the lactic acid solution has been reduced about .2 percent. For example, if the acid solution is .5 percent when put on the curd, it will be .3 percent when drained from the curd. The acidity is determined by titration.

It has been found that the acid solution may be reused several times for purposes of cooking the curd, providing that make-up acid is added to bring up the acidity to the value required. In this connection, three vats of curd have been successively cooked in the same acid water.

After the curd has been cooked in the acid and the acid drained therefrom, the curd is salted. The curd is then placed in hoops and pressed in the conventional manner. After pressing, the curd may be stored in accordance with conventional practices and cured in order to provide a highly desirable cheese, or the curd may then be immediately blended with other cheese and introduced into a cooker. In the cooker, an emulsifying agent may be added thereto but it will be understood that through the use of our curd, it may be possible to eliminate the use of an emulsifying agent while at the same time providing a cheese body which is smooth in texture. While the cheese may be blended to provide process cheese, it is also possible to make process cheese which comprises 100 percent of our curd. If it is desired to reduce the rate of cure, the curd may be stored in a cooler or in a frozen condition for very extended periods.

Occasionally, the curd, when in the whey and prior to the acid cook, does not acquire the desired degree of firmness so that the final curd from the process has unsatisfactorily high moisture content for purposes of making process cheese and cheese food. The curd may not firm to the desired condition prior to the acid cook for any one of several reasons such as a defective starter or failure on the part of the operator to permit the curd to firm to the desired degree. However, it has been found that the conditions of the acid cook may be adjusted so as to compensate for variations in the character of the curd prior to the acid cook. If the curd, after the whey has been withdrawn therefrom or prior to cooking in acid, is soft or has not firmed to the desired degree, the strength of the acid in the acid cook may be increased so as to overcome this condition. Therefore, by adjustment of the acid strength, it is possible to obtain a more uniform curd even though there are variations in the curd making procedure and this makes possible greater standardization of the cheese products made from the curd.

The manufacture of curd in the above manner in connection with the preparation of cheese products is believed to be wholly new and, this is established by the fact that the curd loses its characteristic curdy flavor during cooking in the acid solution. Such loss of the characteristic curdy flavor in a curd by an acid cooking process has not been known heretofore. The preparation of the curd flavor development makes the curd almost immediately useable in the manufacture of process cheese in place of body cheese which, as pointed out above, has required over 10 days to prepare. As a result, this process eliminates the necessity, time, space and expense of storing body cheese. Furthermore, the curd product may be standardized by controlling the process so that there are no substantial variations in the process cheese product. Such standardization is not possible when body cheese, which has widely varying characteristics, is used in making process cheese and, consequently, in order to manufacture process cheese of uniform quality and standards when such cheese includes body cheese, substantial amounts of body cheese must be discarded or, if all the body cheese is used, the process cheese made therefrom has widely varying characteristics. Therefore, our curd product has many advantages over the use of body cheese in the manufacture of process cheese.

As a specific example of our improved process, 2000 pounds of raw milk, containing 3.5 percent butter fat, was introduced into an elongated vat having a steamjacket disposed therearound. Raw milk is preferred because the resulting curd has somewhat lower moisture content and provides a better culture for the starter. Steam was introduced into the jacket of the vat so as to raise the temperature of the milk to about 88° F. and 20 pounds of lactic acid starter was added to the milk in the vat. The temperature was maintained for about one hour whereupon six ounces of rennet was added to set the milk.

After the curd reached the desired firmness, it was cut with ¼ inch curd knives and, in accordance with normal procedure, the contents of the vat were then stirred by a Damrow agitator, the temperature of the vat contents being raised slowly to about 102° F. and maintained until the acid had developed to about .195. The acidity was determined by taking whey from the vat and titrating it against sodium hydroxide, a phenolphthalein indicator being employed. The titrating apparatus was calibrated to give a direct reading of acidity.

After the desired acid development in the vat had been accomplished, the curd and whey were pumped onto a curd table and the whey immediately drained from the curd. The curd table was of the type shown in a co-pending application, Serial No. 367,446 filed July 13, 1953 and entitled Manufacture of Cheese, which application has been assigned to the assignee of this invention. The table included an elongated relatively narrow tray having vertically extending side walls. The ends of the tray were semi-circular in outline so that a Damrow stirrer could reach all of the area of the tray. The bottom of the tray was imperforate and sloped inwardly toward the center of the table to promote drainage of whey from the curd. Along the center of the tray there was provided a well or sump which had vertically extending side walls and which was covered by a perforate cover or screen. A heating jacket was disposed beneath the bottom of the tray, the jacket connecting to suitable hot and cold water lines so as to permit steam heating and cooling of the table as desired.

In order to facilitate draining and to prevent undue acid development on the table, the curd was stirred on the table by means of a Stoelting agitator which carried stirring forks. The curd was drained on the table about one half hour and the last whey from the curd had an acidity of .32. We have found that in order to make a low moisture product, the acidity should be between about .32 and .37. The remaining curd on the table had a firm, resilient body, the curd particles maintaining their definition when compressed in the hand.

While the curd was draining on the curd table, a lactic acid solution, having an acidity of .50, was prepared in the vat and, after the whey had been drained from the curd, the acid was pumped onto the drain table at a temperature of 98° F., which temperature approximated the temperature of the curd, the acid completely immersing the curd on the table. By introducing hot water into the jacket on the curd table, the curd-acid mixture was rapidly heated to obtain the desired curd condition and this condition was obtained at 110° F., the heating being accomplished in 20 minutes. The desired curd, when compressed in the hand, had a plastic, putty-like characteristic and the curd particles lost their visual definition but the mass broke down into curd form when kneaded between the fingers. Moreover, the curd had lost its characteristic curdy flavor.

When the desired curd was obtained, the lactic acid solution was promptly drained from the table leaving the curd thereon, and cool water was pumped into the jacket on the table in order to prevent further development of the curd after the acid was drained from the curd. The acid solution had an acidity of .3 percent. The curd was salted after the acid solution was drained by the addition of fine grain salt in an amount of about 2 percent of the weight of the curd, and the curd was stirred on the table by the Stoelting agitator after the salt addition. Thereafter, the curd was placed in metal hoops, the hoops being placed in a conventional press and the curd being pressed to remove any remaining liquid. The pressed curd was then removed from the hoops and stored.

After two days storage at 42° F., the curd was introduced into a lay-down cooker of the type shown in Norman Kraft United States patent, No. 2,005,996, issued June 25, 1935, the usual amount of emulsifying agent being added. More particularly, the emulsifying agent was disodium phosphate and comprised 1.85 percent of the weight of the mixture. The liquid cheese from the cooker was packaged in loaf form and cooled. It had firm body, good flavor and excellent slicing characteristics. In addition the product had only 40 percent moisture.

Process cheese was also made by introducing the curd into the cooker without addition of emulsifier. The resulting process cheese had excellent flavor and a smooth texture.

As pointed out above, the pressed curd is also adapted to be almost immediately combined with aged cheese, and the curd produced in accordance with the foregoing procedure was blended with certain cheddar-type cheeses, the blend comprising about 25 percent of our curd, 25 percent of current cheese, i. e. cheese which was two months old, 10 percent of cheese 17 months old, and 40 percent short-held cheese which was five months old. To the blend was added 1.75 percent of disodium phosphate and the cheeses and emulsifying agent were cooked in the usual manner and packaged. The resulting cheese had good body, excellent flavor, and highly satisfactory slicing characteristics.

A portion of the curd was stored and was found to knit together, and after four months had excellent body and texture. Moreover, the cheese had a good clean cheese flavor.

While the curd may be used in certain products prior to pressing and hooping, it has been found that such use causes the resulting product to have a high moisture content. Accordingly, if the curd is used in the manufacture of process cheese or cheese food, hooping and pressing is generally necessary.

We have made curd having a moisture content of as low as 30 percent and have blended this with aged and short-held cheeses to provide process cheese of desired moisture content.

From the foregoing, it will be seen that our invention has many advantages, and while many of these advantages are particularly useful in connection with the manufacture of process cheese, the process and product of our invention may be used in the manufacture of other cheese products such as cheese food and cheese spreads. Furthermore, our invention makes possible the production of high quality cheese products at low cost and may be employed to produce a uniform product with minimum loss of product.

The various features of the invention which are believed to be new are set forth in the following claims.

We claim:

1. The improved steps in the manufacture of cheese which consists of immersing drained curd particles in a relatively strong edible acid solution and heating the acid solution to a temperature between about 90° F. and about 120° F.

2. The improved steps in the manufacture of cheese which consists of immersing drained curd particles in a relatively strong edible acid having a temperature approximating that of the curd, and heating the acid to a temperature between about 90° F. and about 120° F.

3. The improved steps in the manufacture of cheese which consists of immersing drained curd particles in a relatively strong edible acid solution having an acidity equivalent to between .2 and 1.5 percent lactic acid, and heating the acid solution to a temperature between about 90° F. and about 120° F.

4. The improved steps in the manufacture of cheese which consists of immersing drained curd particles in a relatively strong edible acid solution having an acidity equivalent to between .2 and 1.5 percent lactic acid, heating the acid solution to a temperature between about 90° F. and about 120° F. and removing the acid solution from the curd particles after the acidity is reduced an equivalent of about .2 percent lactic acid.

5. The improved steps in the manufacture of cheese which consists of immersing drained curd particles in a relatively strong edible acid solution having an acidity equivalent to between .2 and 1.5 percent lactic acid, heating the acid solution to a temperature between about 102° F. and about 110° F., and removing the acid solution from the curd particles after the acidity is reduced an equivalent of about .2 percent lactic acid.

6. The improved steps in the manufacture of cheese which consists of immersing drained curd particles in a relatively strong edible acid solution and heating the acid solution to a temperature between about 102° F. and about 110° F.

7. The improved steps in the manufacture of cheese which consists of immersing drained curd particles in a relatively strong edible acid solution and heating the acid solution to a temperature between about 102° F. and about 110° F., and promptly draining the acid solution from the curd particles.

8. In the manufacture of cheese, the steps which comprise preparing firm curd particles having resilient, springy characteristics by developing the whey so that the last whey drained from the curd has an acidity between about .25 percent lactic acid and .37 percent lactic acid, draining the whey from the curd, immersing the curd in a relatively strong edible acid having an acidity between about .2 percent lactic acid and 1.5 percent lactic acid, or the equivalent, and heating the acid to a temperature between about 102° F. and about 110° F. and to the point where the curd particles form a plastic, putty-like mass when manually compressed and become indistinguishable in the mass.

9. In the manufacture of cheese, the steps which comprise preparing firm curd particles having resilient, springy characteristics by developing the acidity of the whey so that the last whey drained from the curd has an acidity between about .25 and about .37 percent lactic acid or the equivalent, draining the whey from the curd, immersing the curd in a relatively strong edible acid having an acidity between about .2 percent and about 1.5 percent lactic acid, or the equivalent, and heating the acid to a temperature between about 102° F. and 110° F. and to the point where the curd particles form a plastic, putty-like mass when manually compressed and become indistinguishable in the mass but the curd returns to the curd particle form when the mass is kneaded.

10. In the manufacture of cheese, the steps which comprise preparing firm curd particles having resilient, springy characteristics by developing the whey so that the last whey drained from the curd has an acidity between about .32 percent lactic acid and .37 percent lactic acid, draining the whey from the curd, immersing the curd in a relatively strong edible acid having an acidity between about .2 percent lactic acid and 1.5 percent lactic acid, or the equivalent, and heating the acid to a temperature between about 102° F. and about 110° F. and to the point where the curd particles form a plastic, putty-like mass when manually compressed and become indistinguishable in the mass.

11. The improved steps in the manufacture of cheese which consists of immersing drained curd particles in a relatively strong edible acid solution for from 6 to 40 minutes and heating the acid solution to a temperature between about 102° F. and about 110° F.

12. The improved steps in the manufacture of cheese which consists of immersing drained curd particles in a relatively strong edible acid solution having an acidity between about .2 percent and 1.5 percent lactic acid, or the equivalent, for from 6 to 40 minutes and heating the acid solution to a temperature between about 102° F. and about 110° F.

References Cited in the file of this patent

UNITED STATES PATENTS

| Number | Name | Date |
|---|---|---|
| 1,594,627 | Meyers | Aug. 3, 1926 |
| 1,868,422 | Luecke | July 19, 1932 |
| 2,251,496 | Parsons | Aug. 5, 1941 |
| 2,325,217 | Beers | July 27, 1943 |